(12) United States Patent
Nelson et al.

(10) Patent No.: US 8,612,845 B2
(45) Date of Patent: Dec. 17, 2013

(54) METHOD AND APPARATUS FOR FACILITATING DIRECTED READING OF DOCUMENT PORTIONS BASED ON INFORMATION-SHARING RELEVANCE

(75) Inventors: Lester D. Nelson, Santa Clara, CA (US); Diana K. Smetters, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 543 days.

(21) Appl. No.: 12/494,078

(22) Filed: Jun. 29, 2009

(65) Prior Publication Data

US 2010/0332977 A1    Dec. 30, 2010

(51) Int. Cl.
*G06F 3/00* (2006.01)

(52) U.S. Cl.
USPC .......................................... 715/205; 715/234

(58) Field of Classification Search
USPC .......................... 715/234, 243, 254, 255, 205
See application file for complete search history.

(56) References Cited

U.S. PATENT DOCUMENTS

| | | | |
|---|---|---|---|
| 5,339,391 A | 8/1994 | Wroblewski | |
| 6,215,491 B1 | 4/2001 | Gould | |
| 6,907,569 B1 | 6/2005 | Craft | |
| 7,228,492 B1 | 6/2007 | Graham | |
| 2004/0205550 A1* | 10/2004 | Gerken | 715/513 |
| 2005/0059453 A1* | 3/2005 | Benbrahim et al. | 463/16 |
| 2005/0120308 A1* | 6/2005 | Gibson et al. | 715/779 |
| 2005/0138382 A1* | 6/2005 | Hougaard et al. | 713/176 |
| 2007/0172062 A1* | 7/2007 | Waldo et al. | 380/252 |
| 2008/0288603 A1* | 11/2008 | Malcolm | 709/206 |
| 2009/0089059 A1* | 4/2009 | Ma et al. | 704/254 |
| 2009/0144654 A1* | 6/2009 | Brouwer et al. | 715/802 |
| 2009/0292930 A1* | 11/2009 | Marano et al. | 713/189 |

\* cited by examiner

*Primary Examiner* — Kyle Stork
(74) *Attorney, Agent, or Firm* — Shao Yao; Park, Vaughan, Fleming & Dowler LLP

(57) ABSTRACT

One embodiment provides a system to facilitate directed reading of a selected portion of an original document by a recipient. During operation, the system creates a transfer document based at least on the original document and the selected portion. The transfer document, when viewed by the recipient, enables the following operations: opening the transfer document to the selected portion without requiring manual navigation to the selected portion, highlighting the selected portion, obscuring a context surrounding the selected portion based at least on a distance metric from the selected portion, and directly navigating from one highlighted portion to another highlighted portion in the transfer document without requiring manual navigation within obscured contexts. After the system creates the transfer document, it sends the transfer document to the recipient.

22 Claims, 6 Drawing Sheets

METHOD AND APPARATUS FOR FACILITATING DIRECTED READING OF DOCUMENT PORTIONS BASED ON INFORMATION-SHARING RELEVANCE

BACKGROUND

1. Field

This disclosure is generally related to document management. More specifically, this disclosure is related to generating a document so that its salient content is emphasized and non-salient content is obscured.

2. Related Art

Document sharing is an important part of everyday work. For example, people send documents to a co-worker for comments, mark-up, or reading. However, often only a subset of a document's content is required for specific recipients. For example, only a single section in a document might be relevant for a specific recipient.

In a conventional document-sharing system, a user can send the recipient the entire document or only a portion of it. It is possible for the user to highlight relevant sections (e.g., with yellow highlights, change-bars, or marginalia) prior to sending so the recipient can more easily identify the relevant sections. However, the recipient is usually required to scroll down to find the first relevant section and then manually navigate from one relevant section to another. Moreover, the recipient might be presented with too much context: either the relevant sections do not stand out enough from the context or sensitive material is revealed in the context, which should not have been included in the sent document. Furthermore, one recipient's sensitive material might differ from another's.

Alternatively, the user could cut only the relevant sections and then paste and send them to the recipient as a separate document. However, cutting and pasting is cumbersome, disrupts normal reference numbering, and removes the context around the cut-and-pasted section. Such context might be important for the recipient to understand how the section fits in the entire document. Such context might also be important when incorporating the recipient's comments or changes into the original document.

In some situations, the recipient might already be familiar with the details of the context and might only need a hint of the context's details to recall the context and better understand the relevant sections. In other situations, the context might contain sensitive information which should be restricted from the recipient. Conventional document-sharing systems do not include a way of reducing the level of detail to context or restricting access to sensitive context. Reducing the level of detail is important as a focusing method for the recipient: less detail in non-relevant parts means the recipient can better focus on the relevant details. In other words, the non-relevant parts should not draw the recipient's attention.

Moreover, conventional document-sharing systems make it difficult to navigate between relevant sections. Systems such as Microsoft Word® enable a user to move between commented or changed sections, but the recipient sees the full context between those sections rather than a high-level view of the context. More generally, conventional document-sharing systems allow only simple distribution of shared information. For example, these systems cannot determine that only certain recipients with a certain role at a certain organization should or should not see particular sections. Conventional document-sharing systems also do not allow the identification of sharable or restricted sections based on content analysis of the sections and their context.

Some document-sharing systems enable tagging of relevant sections for sharing or restriction. However, once the recipient receives such a tagged document, the context is displayed as a step function (i.e., all or nothing) and immediate navigation between relevant tagged sections is not possible.

SUMMARY

One embodiment provides a system to facilitate directed reading of a selected portion of an original document by a recipient. During operation, the system creates a transfer document based at least on the original document and the selected portion. The transfer document, when viewed by the recipient, enables the following operations: opening the transfer document to the selected portion without requiring manual navigation to the selected portion, highlighting the selected portion, obscuring a context surrounding the selected portion based at least on a distance metric from the selected portion, and directly navigating from one highlighted portion to another highlighted portion in the transfer document without requiring manual navigation within obscured contexts. After the system creates the transfer document, it sends the transfer document to the recipient.

In a variation of this embodiment, the recipient is associated with a domain, which is a hostname where the email will be sent. The recipient can be one or more of: a user name, a role name, a group name, an organization name, the name of a data storage mechanism, the name of a computer system, the name of a software application, and a Uniform Resource Locator (URL). The hostname is a unique name by which a network-attached device (e.g., a computer, file server, network storage device, fax machine, copier, cable modem, etc.) is known on a network. The hostname is used to identify a particular host in various forms of electronic communication such as the World Wide Web, email, and the Usenet.

In some embodiments, creating the transfer document involves: creating a copy of the original document, creating an on-open control in the copy so that the copy opens immediately to the selected portion without requiring manual navigation to the selected portion, highlighting the selected portion in the copy, obscuring a context surrounding the selected portion in the copy based on distance from the selected portion, and creating a navigation control to enable direct navigation from one highlighted portion to another highlighted portion in the copy without requiring manual navigation within obscured contexts.

In some embodiments, creating the transfer document includes: creating a presentation format based at least on an identifier of the recipient and the selected portion, creating a copy of or a link to the original document, thereby enabling a machine associated with the recipient to apply the presentation format to the copy of or link to the original document, and enabling the recipient to view the transfer document based on the presentation format.

In some embodiments, highlighting the selected portion comprises one or more of: overlaying a colored transparent band, sharpening focus, increasing font size, increasing font emphasis, adding underlines, increasing blink rate, expanding space, increasing gray scale, and adding color.

In some embodiments, obscuring a context surrounding the selected portion includes one or more of: increasing blur, decreasing font size, decreasing font emphasis, removing underlines, decreasing blink rate, compressing space, decreasing gray scale, and decreasing color.

In some embodiments, the selected portion includes one or more of: a section, a paragraph, a page, a sentence, a line, a word, a column, a row, and a character. A section can include any identifiable subpart of a document such as a part (e.g., "Part I"), a book (e.g., "Book II"), and a chapter.

In some embodiments, the distance metric includes one or more of: number of sections to the selected portion, number of paragraphs to the selected portion, number of sentences to the selected portion, number of lines to the selected portion, number of columns to the selected portion, number of rows to the selected portion, number of characters to the selected portion, physical distance to the selected portion on a display or on paper, a term frequency-inverse document frequency of a term, and any distance metric based on textual or semantic analysis.

BRIEF DESCRIPTION OF THE FIGURES

In the figures, like reference numerals refer to the same figure elements.

DETAILED DESCRIPTION

Figure 1:
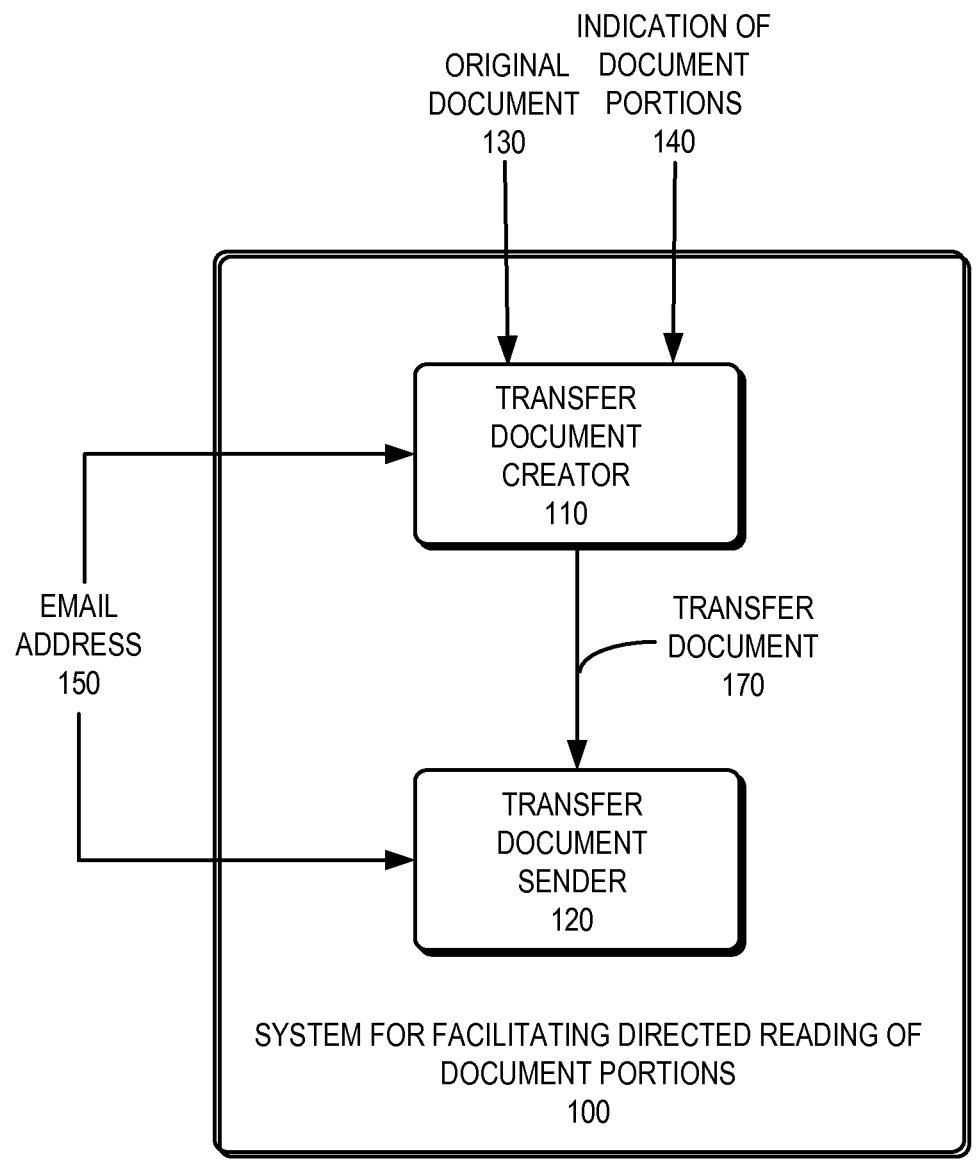
FIG. 1 illustrates the architecture of an exemplary system for facilitating directed reading of document portions in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

One embodiment of the present invention provides a system that enables a user to facilitate directed reading of document portions. Many documents are large, yet both the originating user and the recipient might be interested in only part of a document. The present inventive system can reduce the amount of information the recipient needs to consider and increase the likelihood that the recipient will be able to read (and respond to) the transfer document in a timely way.

A recipient of shared content may only be authorized to have access to some, but not all of the entire document. Currently, the only means to accomplish partial content dissemination is manual extraction of the content from the containing document, as described above. Embodiments of the present invention facilitate dissemination of only a portion of a sensitive document without manual extraction.

Embodiments of the present invention also enable users to share content in the context of their ongoing workflow. For example, a user can mark a certain paragraph as "shared with Jean" while editing that paragraph, without having to remember to send the document or a portion thereof separately later. Such in-document tag-based dissemination reduces cognitive load on the sender, and therefore can reduce mistakes, such as a user forgetting to send the information. This system also lowers the barrier to and overhead of information exchange, so that users can take greater advantage of the resources made available by information sharing.

Furthermore, embodiments of the present invention can also receive feedback from the recipient and incorporate that feedback into the original document, thereby "closing the loop" in document workflow. Feedback can be in the form of an approval, modifications or comments to the transfer document. In this context, "sharing" means allowing the recipient associated with the email address to view and change the selected portion within the transfer document; the modified portion can be incorporated back into the original document. "Showing" means allowing the recipient only to view the selected portion within the transfer document, but not allowing the email address to change the selected portion.

For example, a user can indicate directly in the file she is working on that another user, Jean, should be sent a request for comments on a given paragraph. The system can then automatically present the returned comments in the context of that paragraph. Such presentation allows the user to be immediately aware of both the provided response and the context of the information being discussed, without manually searching for or merging multiple inputs into a single document.

Various formats can be used to indicate the selected portion of the original document that the email address is to receive. One format is a "tag," which refers to a piece of descriptive text that can be inserted in a document, often inline with the document. A tag can specify an operation to be performed on a portion of the document.

A tag can be in the form of a "markup" or "meta-data," both of which can be used to identify specific content for highlighting, restricting, or obscuring. A tag can be delineated from other text by special symbols, such as "<," ">," or "|." Tagging can be automatic or manual. For example, a user can instruct the system to tag automatically all paragraphs containing the word "Bob" to be shown to Cindy.

In general, "tagging" refers to an operation of inserting one or more tags into a document where the tag specifies an action, a portion of the document upon which the action is to be performed, and a destination such as an email address. The action specified by a tag can be any information dissemination operation, such as showing, sharing, restricting, or copying. Each of these actions specifies an associated highlighting and obscuring. Thus, creating the transfer document can also depend on the action. In general, a transfer document contains explicit or implicit information necessary to highlight or obscure document portions intended for a recipient. Note that the system for facilitating directed reading of document portions can take as input a portion identified or indicated by the tags as well as the identifier of the recipient, such as an email address indicated by the tag.

Other examples of actions associated with a tag include the following:

"|SHARE ONLY THIS PARAGRAPH WITH bob@bobscompany.com|" means only the paragraph is shared and everything else redacted. In this example, the action is "share only this paragraph" and the email address is "bob@bobscompany.com."

"|HIGHLIGHT PARAGRAPH FOR bob@bobscompany.com|" means the entire document is transferred, but with the paragraph highlighted.

"|NAVIGATE PARAGRAPH TO bob@bobscompany.com|" means the entire document is transferred, but with navigation to the relevant point when the transfer document is opened.

"|SHARE PARAGRAPH WITH bob@bobscompany.com WITH FUZZINESS|" means a fuzziness control (e.g., button, slider) is added to the transfer document, where the fuzziness control controls the amount of obscurity based on distance away from the paragraph.

Each of these examples can result in different highlighting and different obscuring when the transfer document is viewed by the recipient. In short, the tags signal areas of interest within the document being shared. In effect, one embodiment of the system can render the document with a visual transformation that accentuates the tagged content (e.g., highlighting and enhancement) and obscures untagged content (e.g., elision, redaction, and distortion).

Overall System Architecture and Operation

FIG. 1 illustrates the architecture of an exemplary system for facilitating directed reading of document portions in accordance with an embodiment. A system 100 for facilitating directed reading of document portions can take as input an email address 150, original document 130, and indication of document portions 140. Original document 130 and/or indication of document portions 140 can be input directly (i.e., as the actual source) or indirectly (i.e., as a link or reference).

First, the system creates (operation 110) transfer document 170 based at least on original document 130, indication of document portions 140, and email address 150. Next, the system sends (operation 120) the transfer document to email address 150.

A document portion can be one or more of: a section, a paragraph, a page, a sentence, a line, a word, or a character. Embodiments of the present invention can operate on the whole document or any subset of the document. In general, the indicated portion can be any span of characters in the document and can include an audio clip, a video clip, or a contiguous set of pixels in an image. For example, the indicated portion could start in the middle of one paragraph and end in the middle of another. Original document 130 can be one or more of: text, audio, an image, a graph, a spreadsheet, an email, video, and multi-media.

Transfer document creator 110 creates a transfer document 170. In this context a "transfer" means that original document 130 is transformed into a new document, known as a transfer document 170. Transfer document 170 either contains highlighted or obscured potions of the document based on the email address or contains information, which when viewed by the recipient, can highlight and obscure portions of the document appropriately.

Transfer document 170 is then fed into transfer document sender 120. Transfer document sender 120 sends transfer document 170 to email address 150. Transfer document sender 120 can send transfer document 170 using various delivery methods including email, ftp, web uploads, and web feeds such as Really Simple Syndication (RSS). Note that the transfer document can also be represented as a link or indirect reference to the transfer document.

System 100 for facilitating directed reading of document portions can receive its input from a computer on which it resides, from a wired or wireless network, or from any device or system capable of communicating with system 100. Similarly, transfer document sender 120 can communicate to other entities through a wired or wireless network, or via any device or system capable of communicating with system 100.

Figure 2:
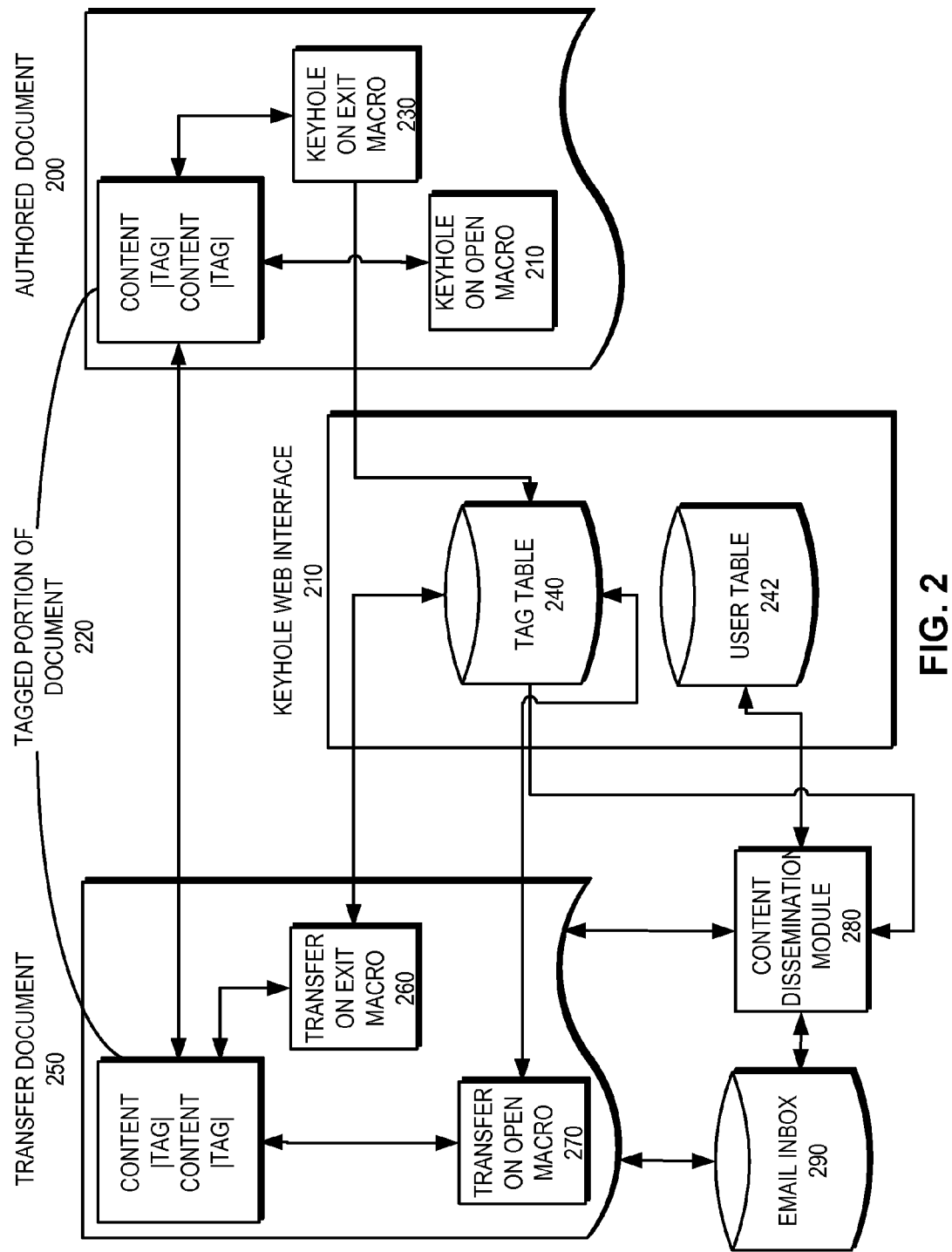
FIG. 2 illustrates a block diagram of an exemplary system in accordance with a preferred embodiment.

Recall that indication of document portions 140 can be identified using tags. FIG. 2 illustrates a block diagram of an exemplary system in accordance with an embodiment, which uses such tags. A tag in this embodiment might be "|SHARE PARAGRAPH WITH bob@bobscompany.com|" as associated with a particular paragraph. Here, the "|" serve as delimiters to distinguish a tag from the rest of the content. In this embodiment, the system performs actions to disseminate the information. Specifically, authorized document 200 (i.e., original document 130) includes a "keyhole on open" macro 210, which opens the authored document so that tags can be added or modified. Specifically, tagged portion of document 220 illustrates two pieces of content in authored document 200 (and transfer document 250) associated with tags. "Keyhole on exit" macro 230 causes a tag table 240 to be produced in a "keyhole" web interface 210 and initiates creation of transfer document 250. In general, the term "on open" refers to operations that can take place upon opening a document and the term "on exit" refers to operations that can take place upon exiting the document.

Exiting can mean that the user closes the document or it can mean that the user has initiated an operation associated with exiting a not-yet-closed document. For example, exiting can mean that the user does not close authored document 200 when initiating the creation of transfer document 250.

"Keyhole" web interface 210 can be a browser window or any GUI capable of displaying or navigating through a tag table 240 or user table 242. Tag table 240 stores all the tags of authored document 200 and transfer document 250. User table 242 stores all the user identifiers (e.g., email addresses) so that transfer document 250 can be disseminated to appropriate users.

Content dissemination module 280 (i.e., transfer document sender 120) sends transfer document 250 to email address 150. Once transfer document 250 is sent to the email address, it appears in a corresponding email inbox 290.

Transfer document 250 is also associated with tagged portion of document 220. A "transfer on open" macro 270 uses information from tag table 240 to appropriately highlight, restrict, or obscure content in transfer document 250 upon opening transfer document 250. A "transfer on open" macro 270 can also open transfer document 250 to a highlighted portion and/or initiate a guided tour of transfer document 250 (e.g., from highlighted portion to highlighted portion).

A "transfer on exit" macro 260 can update tag table 240 and initiate sending a modified transfer document 250 through content dissemination module 280. For example, the recipient associated with email address 150 can change, add comments to, and add additional tags to transfer document 250, and email transfer document 250 back to the author or to other email addresses. Note that content dissemination module 280 disseminates content based on user table 242. In general, a "transfer on exit" macro 260 can initiate a feedback loop back to the author or to any email address. That is, transfer document 250 can effectively become another authored document 200.

Note that a tag can also be specified by using a natural-language processing engine which can locate specific portions and understand what entities should or should not see the selected portions. The system can selectively obscure certain names, phrases, or portions based at least on the email address, regardless of whether or not those names, phrases, or portions occur in a highlighted portion. For example, if user Bob should not be allowed to know that user Cindy was responsible for certain actions described in the document, the system can obscure the name "Cindy" in the entire document. Additionally, the system can receive feedback from the recipient in the form of modifications, comments, and approval.

Highlighting Content and Obscuring Context

Figure 3:
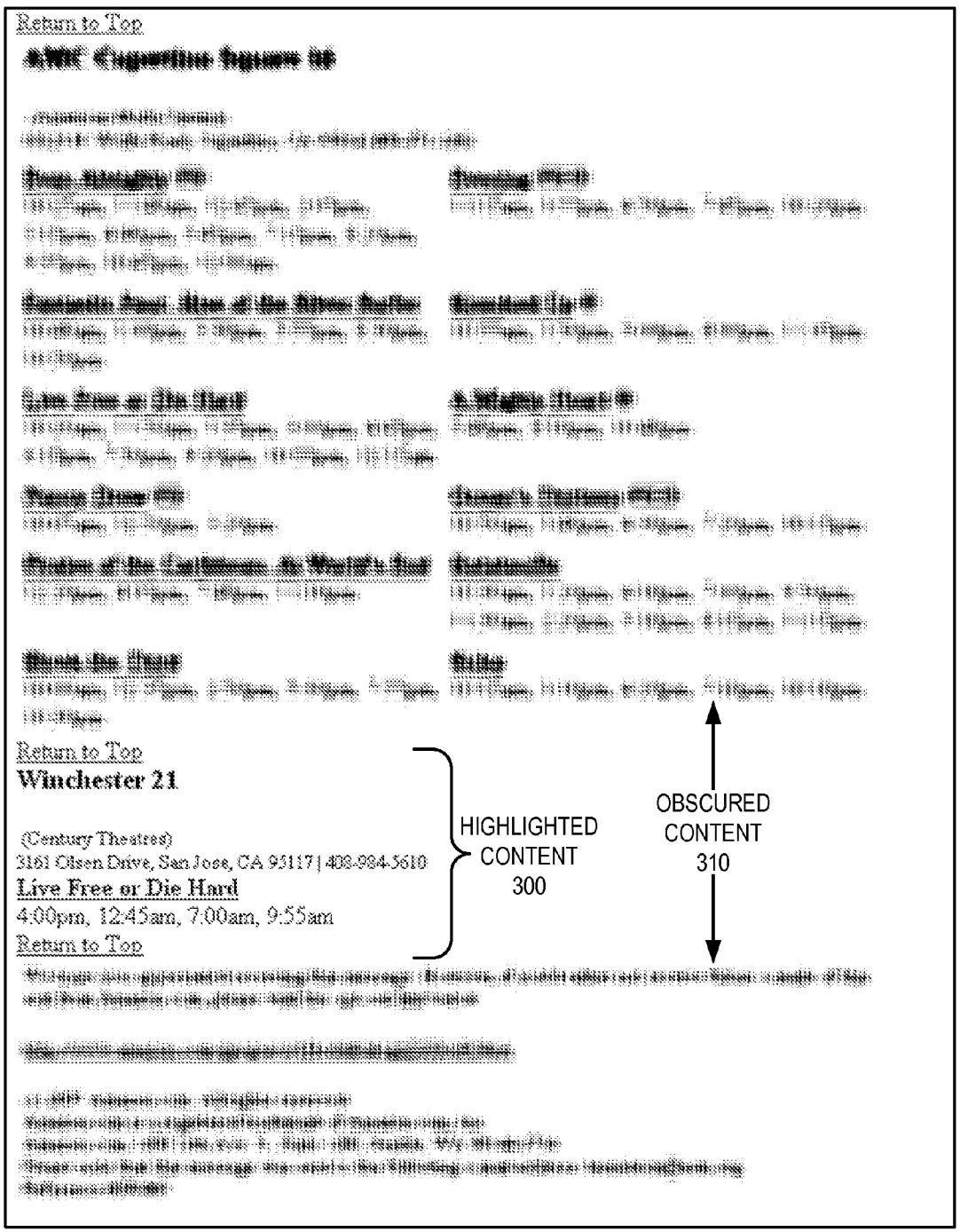
FIG. 3 illustrates how the system can highlight content and obscure the context in accordance with an embodiment.

FIG. 3 illustrates how the system can highlight content and obscure the context in accordance with an embodiment. The figure shows highlighted content 300 and obscured content 310. As distance from highlighted content 300 increases, obscurity increases. For example, content from several pages away (not shown) from highlighted content 300 might be completely unreadable, whereas content a few inches away from highlighted content 300 is still somewhat readable. When viewed by the recipient associated with the email address, the transfer document can look like the illustration shown in FIG. 3. However, many different techniques can be used to highlight and obscure content.

Creating the Transfer Document

Figure 4:
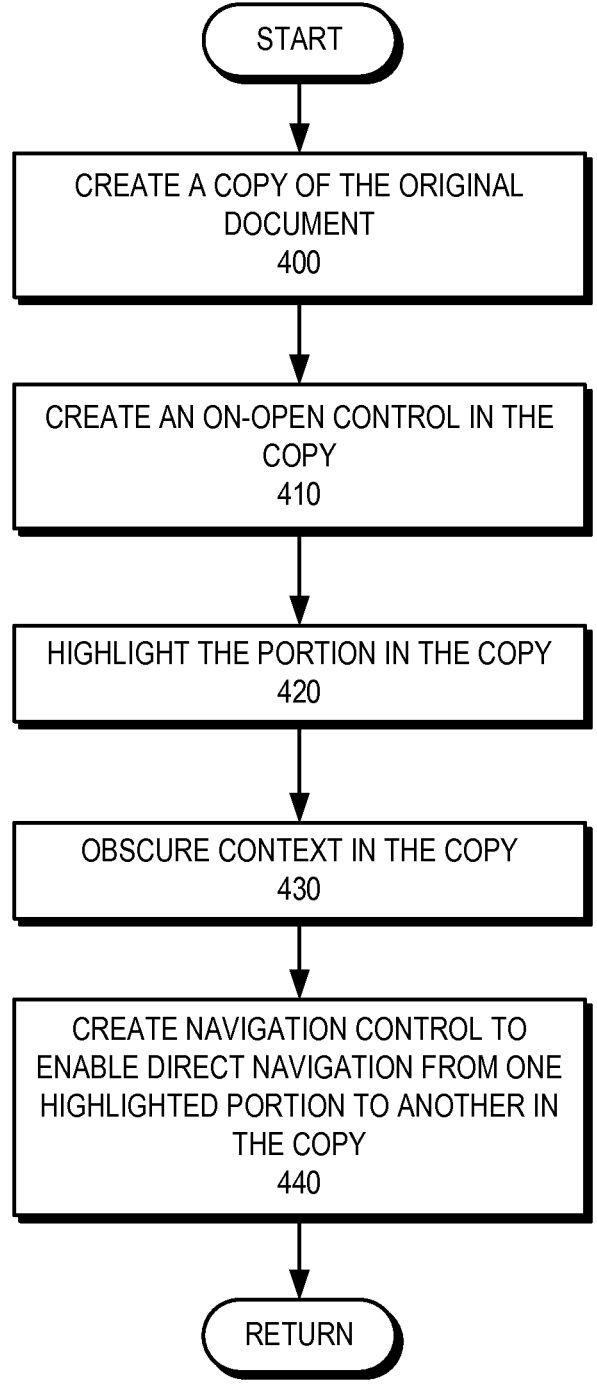
FIG. 4 presents a flowchart illustrating the process of creating the transfer document in accordance with an embodiment.

FIG. 4 presents a flowchart illustrating the process of creating the transfer document in accordance with an embodiment. In this embodiment the system creates a standalone document which can be viewed with a document viewing application. The standalone document incorporates an "on-open" control feature, which forces the document to open to the selected portion upon the recipient opening the document. The standalone document also incorporates highlighting of the selected portions, obscuring the context around the selected portions, and navigation controls that enable the recipient to move from one highlighted portion to another without requiring manual navigation within the non-highlighted portions. This embodiment enables security to be tightly controlled by the system rather than the user. For example, the user is not able to "un-obscure" originally obscured portions because the copied document does not include the original sections in un-obscured form.

During operation, the system creates a copy of the original document (operation 400). Next, the system creates an "on-open" control in the copy (operation 410), which forces the document to open to the selected portion upon opening, without requiring manual navigation to that portion. Subsequently, the system highlights the selected portion in the copy (operation 420). This operation can include one or more of: overlaying a colored transparent band on the text, sharpening focus, increasing font size, increasing font emphasis, adding underlines, increasing blink rate, expanding space, increasing gray scale, and adding color.

Next, the system obscures the context around the selected portion (operation 430) based at least on the distance from a given text location and the selected portion. Obscuring the context surrounding the selected portion includes one or more of: increasing blur, decreasing font size, decreasing font emphasis, removing underlines, decreasing blink rate, compressing space, decreasing gray scale, and decreasing color.

In some embodiments, obscuring the context around the selected portion can be based on one or more of the following distance metrics from the selected portion: the number of sections to the selected portion, the number of paragraphs to the selected portion, the number of sentences to the selected portion, the number of lines to the selected portion, the number of columns to the selected portion, the number of rows to the selected portion, the number of characters to the selected portion, and physical distance to the selected portion on a display or on paper. In further embodiments, the system can use more general or abstract distance metrics based on textual or semantic analysis of the document. For example, the distance metric can be based on the term frequency-inverse document frequency (TF.IDF) of one or more selected terms. More details on TF.IDF can be found at http://en.wikipedia.org/wiki/Tf-idf. In general, any valid, user-defined distance metric can be used.

The system can also obscure text based on semantic similarity. For example, the system can highlight text whose meaning is similar and obscure text whose meaning is not similar. Similarity can be measured using various content similarity measures. For example, similarity can be measured in terms of the number of words in common.

The system can also use a policy to determine whether a section should be obscured or not for a particular email address. For example, the policy can specify that "Bob" is not to view content involving "Cindy" regardless of any tags specifying the contrary.

The system can also create a navigation control to enable direct navigation from one highlighted portion to another highlighted portion in the copy without requiring manual navigation within obscured contexts.

Figure 5:
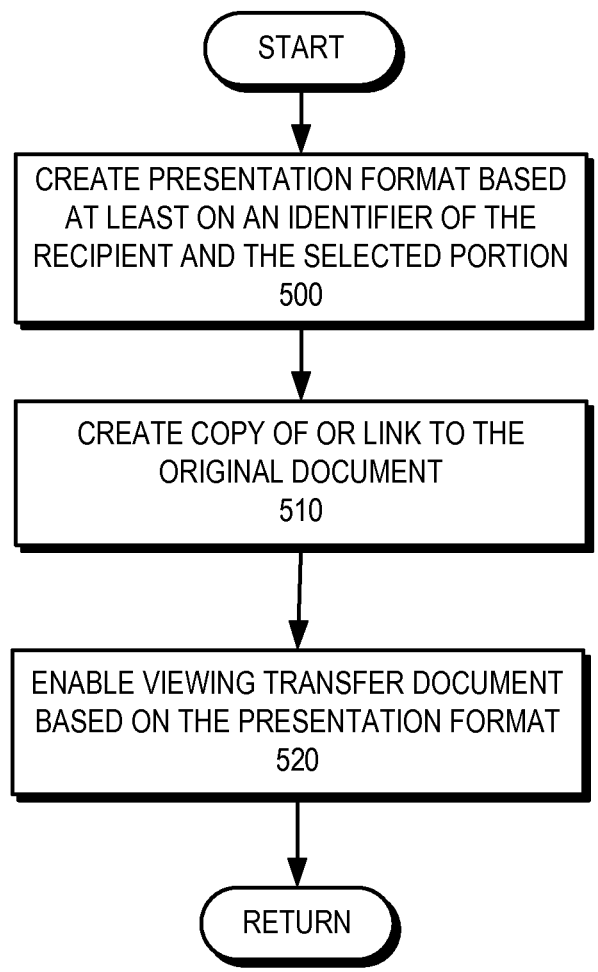
FIG. 5 presents a flowchart illustrating the process of creating the transfer document in accordance with an embodiment.

FIG. 5 presents a flowchart illustrating the process of creating the transfer document in accordance with one embodiment. In this embodiment, the system creates a presentation format based at least on the email address and the selected portion (operation 500). Next, the system creates a copy of or link to the original document (operation 510). Subsequently, the system enables viewing of the transfer document based on the presentation format (operation 520). In this embodiment, the transfer document presentation format is separate from the content.

For example, if the document is HTML-based web content, the presentation format could be a set of Javascript™ (a trademark of Sun Microsystems Inc.) functions with visible controls (buttons, sliders, etc) that give access (direct setting or through some functional relationship) to the viewing parameters. The presentation format enables the user to control the degree of highlighting. It also allows the user to forward the document and the presentation format to other users, who might require greater obscuring. In further embodiments, the system can allow the recipient associated with the email address to adjust the obscuring, based at least on a policy which describes what email address are allowed to adjust obscuring. For example, this adjustment might be based on a slider bar control.

In general, separating the presentation format from the document (either copies of or links to) enables greater viewing flexibility. Moreover, this separation enables easier modification if the transfer document changes, but not the presentation format or vice versa.

In some embodiments, the system can create and send a "remix" document to the email address, where the "remix" document includes a set of viewing actions applied to other accessible content (e.g., documents in a shared repository, URLs, etc.). Remix instructions could include: indication of content of interest (e.g., links and queries) and viewing instructions (i.e., a script). Viewing instructions can be based on operations to access such content and highlight and obscure the content as described above.

In some embodiments of the present invention, the system can allow the email address to remove or otherwise modify the obscured context (e.g., clear all distortions of the context so that the context can be closely read).

Guided Tours

In further embodiments of the present invention, the system can create a transfer document, which when viewed by the recipient enables a "guided tour." This guided tour assists the recipient in navigating to the highlighted content instead of over obscured content. The transfer document, which when viewed by the recipient, can include various viewing transport controls (e.g., play, pause, next, previous, rewind, fast-forward). Other controls in the transfer document can include manual navigation to highlighted content, navigation triggered by an event (e.g., arrival of a message at a socket), and timed navigation. For example, the timed navigation might operate as in a "slide show:" each highlighted portion can be viewed for a fixed but specifiable number of seconds before proceeding to the next highlighted section. Furthermore, the timed navigation can also include repeat cycles.

Apparatus for Facilitating Directed Reading of Document Portions

Figure 6:
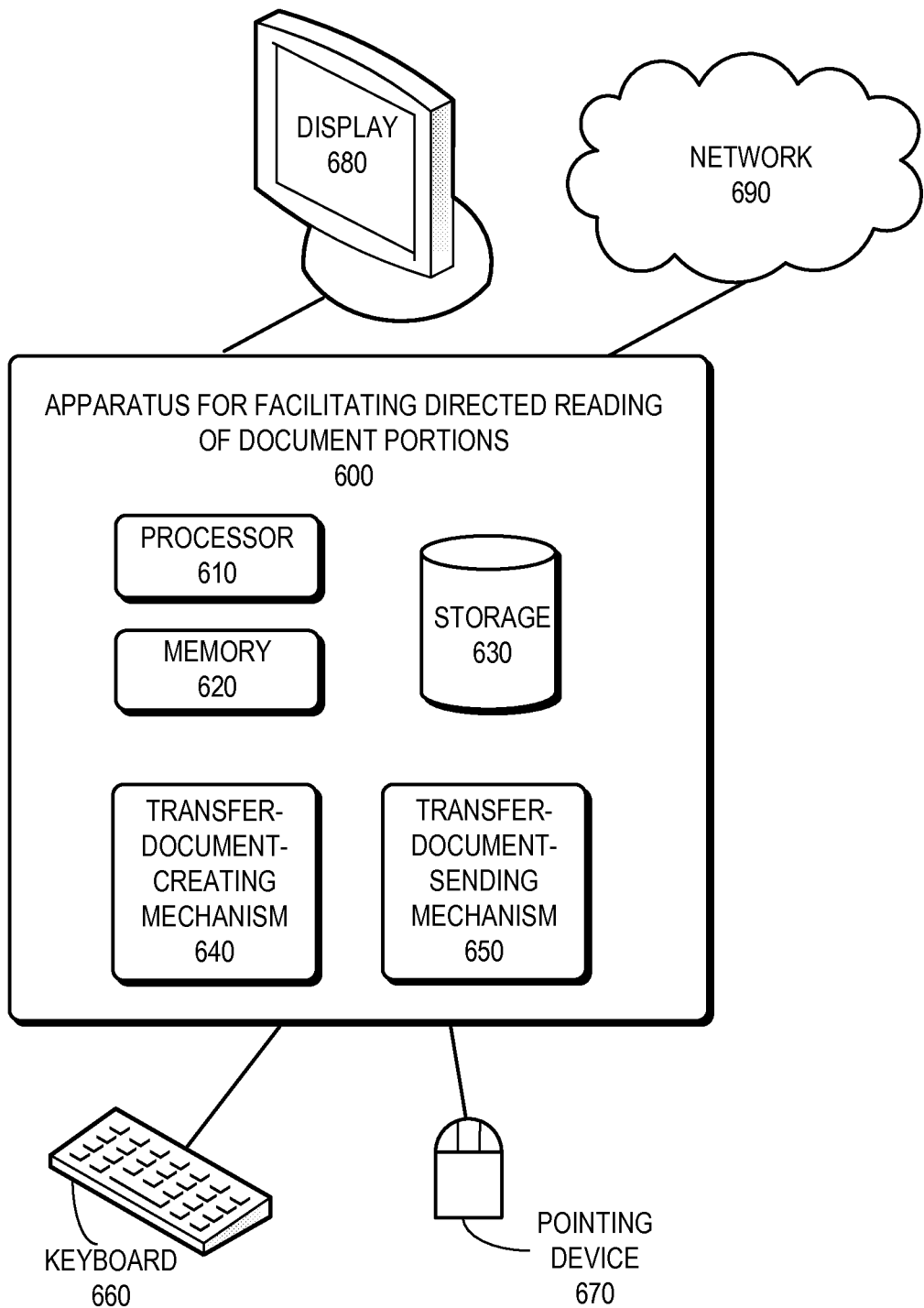
FIG. 6 presents an exemplary apparatus for facilitating directed reading of document portions in accordance with an embodiment.

FIG. 6 presents an exemplary apparatus for facilitating directed reading of document portions in accordance with an embodiment.

In this example, apparatus 600 comprises a processor 610, a memory 620, a storage 630, a transfer-document-creating mechanism 640, and a transfer-document-sending mechanism 650, all of which can be in communication with each other through various means.

For example, processor 610 can communicate through a bus system to memory 620, storage 630, transfer-document-creating mechanism 640, and transfer-document-sending mechanism 650. Processor 610 can also communicate through direct couplings to memory 620, storage 630, transfer-document-creating mechanism 640, and transfer-document-sending mechanism 650.

In some embodiments, transfer-document-creating mechanism 640 and transfer-document-sending mechanism 650 can be part of processor 610. Further, in some embodiments, the system may not include a separate processor and memory. In addition, transfer-document-creating mechanism 540 and/or transfer-document-sending mechanism 550 may be implemented as general-purpose computation engines.

Storage 630 stores programs to be executed by processor 610. Specifically, storage 630 stores a program that implements a system (application) for facilitating directed reading of document portions. During operation, the application program can be loaded from storage 630 into memory 620 and executed by processor 610. As a result, apparatus for facilitating directed reading of document portions 600 can perform the functions described above. Apparatus for facilitating directed reading of document portions 600 can be coupled to an optional display 680, keyboard 660, and pointing device 670.

In an embodiment, processor 610 activates transfer-document-creating mechanism 640 and supplies it with the document, the selected portion and the email address. Next, processor 610 activates transfer-document-sending mechanism 650 and supplies it with the transfer document and the email address. In turn, transfer-document sending mechanism sends the transfer document to the email address.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executed method to facilitate directed reading of portions of an original document, comprising:
    receiving, by a computing device, a transfer document associated with the original document, wherein the transfer document comprises a tag that specifies a selected portion of the transfer document, an identifier that identifies an intended recipient of the transfer document, and an action to be performed on the selected portion when the transfer document is accessed by the intended recipient;
    opening the transfer document for a local user;
    determining whether the local user matches the intended recipient of the transfer document; and
    performing, by the computing device, the action on the selected portion of the transfer document in response to determining that the local user matches the intended recipient, wherein the action includes at least one of:
        opening the transfer document to the selected portion without requiring manual navigation to the selected portion;
        highlighting the selected portion;
        obscuring a context surrounding the selected portion; and
        directly navigating from the selected portion to a different selected portion in the transfer document without requiring manual navigation to skip obscured contexts.

2. The method of claim 1, wherein the transfer document further comprises one or more of:
    a copy of the original document;
    an on-open control in the copy that facilitates opening the copy immediately to the selected portion without requiring manual navigation to the selected portion;
    a highlighted document portion, which includes a highlighting overlaid over the selected portion in the copy;
    an obscured portion surrounding the selected portion in the copy based on a distance from the selected portion; and
    a navigation control that facilitates direct navigation from one highlighted portion to another highlighted portion in the copy without requiring manual navigation within obscured contexts.

3. The method of claim 1, wherein the transfer document further comprises one or more of:
    a presentation format associated with the selected portion; and
    a copy of, or a link to, the original document, which facilitates a machine associated with the intended recipient to apply the presentation format to the copy of or link to the original document.

4. The method of claim 1, wherein highlighting the selected portion comprises one or more of:
  overlaying a colored transparent band;
  sharpening focus;
  increasing font size;
  increasing font emphasis;
  adding underlines;
  increasing blink rate;
  expanding space;
  increasing gray scale; and
  adding color.

5. The method of claim 1, wherein obscuring a context surrounding the selected portion comprises one or more of:
  increasing blur;
  decreasing font size;
  decreasing font emphasis;
  removing underlines;
  decreasing blink rate;
  compressing space;
  decreasing gray scale; and
  decreasing color.

6. The method of claim 1, wherein the selected portion comprises one or more of: a section, a paragraph, a page, a column, a row, a sentence, a line, a word, and a character.

7. The method of claim 1, wherein obscuring the context surrounding the selected portion involves applying a distance metric, and wherein the distance metric comprises one or more of:
  number of sections to the selected portion;
  number of paragraphs to the selected portion;
  number of sentences to the selected portion;
  number of lines to the selected portion;
  number of columns to the selected portion;
  number of rows to the selected portion;
  number of characters to the selected portion;
  physical distance to the selected portion on a display or on paper;
  a term frequency-inverse document frequency of a term; and
  any distance metric based on textual or semantic analysis.

8. The method of claim 1, further comprising:
  updating the transfer document by inserting a second tag; and
  sending the updated transfer document back to an original sender of the transfer document.

9. An apparatus to facilitate directed reading of portions of an original document, comprising:
  a processor;
  a memory;
  a transfer-document-receiving mechanism configured to receive a transfer document associated with the original document, wherein the transfer document comprises a tag that specifies a selected portion of the transfer document, an identifier that identifies an intended recipient of the transfer document, and an action to be performed on the selected portion when the transfer document is accessed by the identified recipient;
  a transfer-document opening mechanism configured to open the transfer document for a local user;
  a determination mechanism configured to determine whether the local user matches the intended recipient of the transfer document; and
  an action-performing mechanism configured to perform the action on the selected portion of the transfer document in response to determining that the local user matches the intended recipient; wherein the action includes at least one of:
    opening the transfer document to the selected portion without requiring manual navigation to the selected portion;
    highlighting the selected portion;
    obscuring a context surrounding the selected portion; and
    directly navigating from the selected portion to a different selected portion in the transfer document without requiring manual navigation to skip obscured contexts.

10. The apparatus of claim 9, wherein the transfer document further comprises one or more of:
  a copy of the original document;
  an on-open control in the copy that facilitates opening the copy immediately to the selected portion without requiring manual navigation to the selected portion;
  a highlighted document portion, which includes a highlighting overlaid over the selected portion in the copy;
  an obscured portion surrounding the selected portion in the copy based on distance from the selected portion; and
  a navigation control that facilitates direct navigation from one highlighted portion to another highlighted portion in the copy without requiring manual navigation within obscured contexts.

11. The apparatus of claim 9, wherein the transfer document further comprises one or more of:
  a presentation format associated with the selected portion; and
  a copy of, or a link to, the original document, which facilitates a machine associated with the intended recipient to apply the presentation format to the copy of or link to the original document.

12. The apparatus of claim 9, wherein highlighting the selected portion comprises one or more of:
  overlaying a colored transparent band;
  sharpening focus;
  increasing font size;
  increasing font emphasis;
  adding underlines;
  increasing blink rate;
  expanding space;
  increasing gray scale; and
  adding color.

13. The apparatus of claim 9, wherein obscuring a context surrounding the selected portion comprises one or more of:
  increasing blur;
  decreasing font size;
  decreasing font emphasis;
  removing underlines;
  decreasing blink rate;
  compressing space;
  decreasing gray scale; and
  decreasing color.

14. The apparatus of claim 9, wherein the selected portion comprises one or more of: a section, a paragraph, a page, a column, a row, a sentence, a line, a word, and a character.

15. The apparatus of claim 9, wherein obscuring the context surrounding the selected portion involves applying a distance metric, and wherein the distance metric comprises one or more of:
  number of sections to the selected portion;
  number of paragraphs to the selected portion;
  number of sentences to the selected portion;
  number of lines to the selected portion;
  number of columns to the selected portion;
  number of rows to the selected portion;
  number of characters to the selected portion;

physical distance to the selected portion on a display or on paper;

a term frequency-inverse document frequency of a term; and any distance metric based on textual or semantic analysis.

16. A non-transitory computer-readable storage device storing instructions that when executed by a computer cause the computer to perform a method to facilitate directed reading of portions of an original document by a recipient, the method comprising:

receiving a transfer document associated with the original document, wherein the transfer document comprises a tag that specifies a selected portion of the transfer document, an identifier that identifies an intended recipient of the transfer document, and an action to be performed on the selected portion when the transfer document is accessed by the identified intended recipient;

opening the transfer document for a local user;

determining whether the local user matches the intended recipient of the transfer document; and performing, by the computing device, the action on the selected portion of the transfer document in response to determining that the local user matches the intended recipient, wherein the action includes at least one of:

opening the transfer document to the selected portion without requiring manual navigation to the selected portion;

highlighting the selected portion;

obscuring a context surrounding the selected portion; and directly navigating from the selected portion to a different selected portion in the transfer document without requiring manual navigation to skip obscured contexts.

17. The storage device of claim 16, wherein the transfer document further comprises one or more of:

a copy of the original document;

an on-open control in the copy that facilitates opening the copy immediately to the selected portion without requiring manual navigation to the selected portion;

a highlighted document portion, which includes a highlighting overlaid over the selected portion in the copy;

an obscured portion surrounding the selected portion in the copy based on distance from the selected portion; and a navigation control that facilitates direct navigation from one highlighted portion to another highlighted portion in the copy without requiring manual navigation within obscured contexts.

18. The storage device of claim 16, wherein the transfer document further comprises one or more of:

a presentation format associated with the selected portion; and a copy of, or a link to, the original document, which facilitates a machine associated with the intended recipient to apply the presentation format to the copy of or link to the original document.

19. The storage device of claim 16, wherein highlighting the selected portion comprises one or more of:

overlaying a colored transparent band;

sharpening focus;

increasing font size;

increasing font emphasis;

adding underlines;

increasing blink rate;

expanding space;

increasing gray scale; and adding color.

20. The storage device of claim 16, wherein obscuring a context surrounding the selected portion comprises one or more of:

increasing blur;

decreasing font size;

decreasing font emphasis;

removing underlines;

decreasing blink rate;

compressing space;

decreasing gray scale; and decreasing color.

21. The storage device of claim 16, wherein the selected portion comprises one or more of: a section, a paragraph, a page, a column, a row, a sentence, a line, a word, and a character.

22. The storage device of claim 16, wherein obscuring the context surrounding the selected portion involves applying a distance metric, and wherein the distance metric comprises one or more of:

number of sections to the selected portion;

number of paragraphs to the selected portion;

number of sentences to the selected portion;

number of lines to the selected portion;

number of columns to the selected portion;

number of rows to the selected portion;

number of characters to the selected portion;

physical distance to the selected portion on a display or on paper;

a term frequency-inverse document frequency of a term; and any distance metric based on textual or semantic analysis.

* * * * *